United States Patent [19]
Danner et al.

[11] Patent Number: 5,873,911
[45] Date of Patent: Feb. 23, 1999

[54] WATER-SOLUBLE UREA DERIVATIVE POLYMERS WITH QUATERNARY AMMONIUM GROUPS AND THEIR USE

[75] Inventors: Bernard Danner; Francis Palacin, both of Riedisheim, France

[73] Assignee: Clariant Finance (BVI) Limited, Tortola, Virgin Islands (Br.)

[21] Appl. No.: 911,396

[22] Filed: Aug. 14, 1997

[30] Foreign Application Priority Data

Aug. 15, 1996 [EP] European Pat. Off. .............. 96810543

[51] Int. Cl.⁶ ................................ D06P 1/66; D06P 3/66; D06P 5/06; D06P 5/08
[52] U.S. Cl. .......................... 8/543; 8/554; 8/618; 8/652; 8/918; 252/8.86; 528/250; 528/256
[58] Field of Search ..................... 528/250, 256; 8/554, 543, 652, 618; 252/8.86

[56] References Cited

U.S. PATENT DOCUMENTS

| | | | |
|---|---|---|---|
| 4,436,524 | 3/1984 | Valenti | 8/551 |
| 4,452,606 | 6/1984 | van Diest et al. | 8/496 |
| 4,484,927 | 11/1984 | Valenti | 8/554 |
| 5,081,294 | 1/1992 | Töpfl et al. | 564/59 |
| 5,133,779 | 7/1992 | Töpfl et al. | 8/606 |
| 5,270,355 | 12/1993 | Kawano et al. | 523/404 |
| 5,569,724 | 10/1996 | Hendricks et al. | 525/432 |
| 5,654,359 | 8/1997 | Hasegawa et al. | 524/514 |

FOREIGN PATENT DOCUMENTS

| | | |
|---|---|---|
| 0 151 370 | 8/1985 | European Pat. Off. . |
| 1 595 336 | 9/1970 | Germany . |

*Primary Examiner*—Margaret Einsmann
*Attorney, Agent, or Firm*—Scott E. Hanf

[57] ABSTRACT

Polymeric, water soluble, quaternary ammonium compounds (F) obtainable by quaternization of (a) at least one amino-group-containing urea compound that contains one or more groups of the formula

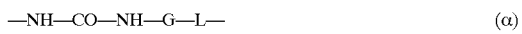

$$—NH—CO—NH—G—L— \quad (\alpha)$$

in which G signifies a bridging group
and L signifies a tertiary, quaternizable amino group with
(b) ($b_1$) an epihalohydrin and optionally
($b_2$) at least one further quaternizing agent
to a quaternized product (q)
and reaction of the quaternized product (q) with
(c) a dialdehyde of formula (I)

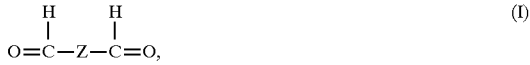

$$O=\underset{\underset{H}{|}}{C}—Z—\underset{\underset{H}{|}}{C}=O, \quad (I)$$

in which Z signifies methylene or the direct bond,
or a urea derivative thereof, are suitable as fixing adjuvants in particular in continuous processes under nearly neutral to acidic conditions especially for the improvement of wet fastnesses of dyeings on hydrophilic fibrous material.

14 Claims, No Drawings

WATER-SOLUBLE UREA DERIVATIVE POLYMERS WITH QUATERNARY AMMONIUM GROUPS AND THEIR USE

In the dyeing of hydrophilic fibrous substrates with substantive (in particular non-ionic or anionic) dyes the wet fastnesses of the obtained dyeings may be different and/or insufficient depending on the dye, the substrate and the dyeing conditions, so that the use of fastness improving additions is desired and is also readily performed in dye houses. In fastness improving additives—in general fixing adjuvants—there may occur several problems, e.g. that a certain fixing adjuvant is adapted to a certain, narrowly selected dyestuff gamut and consequently displays on different dyes a different fixing activity i.e. wet fastness improving activity (e.g. in particular in dyeings with direct dyes that are not metal complexes) (e.g. those described in DE-A-3216745 or 3217835 or in EP-A-0150370 or 0665255), or that the fixing agents must be applied under distinctly alkaline conditions (e.g. those described in EP-A-0259251) after which there is repeatedly rinsed (among else with hot water) and/or a neutralization (of the goods and/or of the backwater) has to be inserted.

It has now been found that by employing the below defined polymers (F), which may be applied by impregnation processes under neutral to acidic conditions, there may be achieved an outstanding improvement of the fastnesses of dyeings obtainable with substantive (mainly non-ionic or in particular anionic) dyes essentially with direct dyes, reactive dyes, sulphur dyes and vat dyes, on hydrophilic substrates which contain in their structure hydroxy groups (mainly cellulosic fibres), amino groups or thiol groups (mainly natural polyamides, essentially polypeptides and collagen).

The invention relates to the water-soluble polymers (F) as defined below and compositions thereof, their production and their use.

The invention thus provides polymeric, water-soluble, quaternary ammonium compounds (F) that are obtainable by quatemization of (a) at least one amino-group-containing urea compound that contains one or more groups of the formula

—NH—CO—NH—G—L—  (α), in which

G signifies a bridging group and L signifies a tertiary, quaternizable amino group with (b) (b₁) an epihalohydrin and optionally (b₂) at least one further quatemizing agent to a quatemized product (q)

and reaction of the quatemized product (q) with (c) a dialdehyde of formula

in which Z signifies methylene or the direct bond, or a urea derivative thereof.

The amino-group-containing urea compounds (a) contain at least one tertiary, quaternizable amino group. They are obtainable in particular by condensation of urea with (a₁) at least one polyamine that contains at least one primary amino group and at least one secondary or tertiary amino group and/or at least one aminoamide that contains an unsubstituted carbamoyl group and at least one secondary or tertiary amino group, and optionally reaction with (a₂) at least one further aliphatic reactant, which is capable of an alkylating or acylating reaction with urea and/or with a reaction product of urea with (a₁) to form an acylated or tertiary amino group.

The reaction of urea with (a₁) is advantageously carried out in such a way that there are formed simple or, if (a₁) contains several reactive —NH₂ groups, also oligomeric condensates under cleavage of ammonia. Reactant (a₂) serves substantially for the reaction of any still present primary or also secondary amino groups in the reaction product and/or optionally for the reaction of at least a part of any residual non-reacted —NH₂ groups of the urea.

As (a₁) there is emp loyed advan tageously at least one compound of formula

in which

R₁ signifies hydrogen, $C_{1-2}$-alkyl or a group of formula —X₁—CO—NH₂,

R₂ signifies hydrogen, $C_{1-2}$-alkyl or a group of formula —X—NH₂ or —X₁—CO—NH₂, or R₁ and R₂ together with the nitrogen atom to which they are linked signify a ring of formula

X signifies $C_{2-6}$-alkylene,

X₁ signifies $C_{1-6}$-alkylene,

W signifies —NR₃—, —O— or —CO—NH₂,

W' signifies —O— or —NR₃—,

Y signifies a group of formula —X—NH₂ or —X₁—CO—NH₂, and n signifies a number from 0 to 4, with the proviso that, if R₁ and R₂ signify both hydrogen, in at least one compound of formula (II) n stands for a number from 1 to 4.

Among the $C_{1-4}$-alkyl radicals, i.e. among ethyl and methyl, methyl is preferred.

The alkylene groups in the significance of X are preferably linear and unbranched; there may be mentioned in particular the following: ethylene, propylene-1,3, butylene-1,4 and hexamethylene, among which ethylene and propylene are particularly preferred.

The alkylene radicals in the significance of X₁ are preferably open-chain radicals and if they contain 3 to 6 carbon atoms, they may also be branched; there may for instance be mentioned methylene, ethylene, propylene-1,2 and -1,3, butylene-1,3 and -1,4 and pentamethylene; among the significances of X₁ ethylene is preferred in particular.

R₃ stands advantageously for R₃', i.e. for hydrogen, $C_{1-2}$-alkyl or —X₁—CO—NH₂.

W signifies advantageously —NR₃— or —CO—NH—, preferably W₁, i.e. —NR₃'— or —CO—NH—.

If n signifies 2 to 4 the corresponding n groups of formula —X—W— may have with each other the same significance or different significances. If the molecule contains two or more groups Y these may with each other have the same significance or different significances. Preferably at least one Y is a group —X—NH₂.

The compounds of formula (II) are known or may be produced analogously to known methods. If W stands for —CO—NH— and/or if $R_2$ stands for a group of formula —$X_1$—CO—$NH_2$ the respective amides may be produced for instance by reaction of a corresponding starting amine with for instance acrylamide, methacrylamide or a $C_{4-6}$-lactam; if $X_1$ stands for methylene the respective starting amine may e.g. be alkylated with chloroacetamide. The analogous reactions are valid for the introduction of groups of formula —$X_1$—CO—$NH_2$ as $R_3$ onto a corresponding amine backbone.

Among the compounds ($a_1$) of formula (II) the following are of particular relevance:

($a_{11}$) Compounds of formula

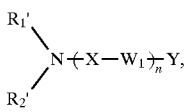 (IIa)

wherein
$R_1'$ signifies $C_{1-2}$-alkyl,
$R_2'$ signifies $C_{1-2}$-alkyl,
$W_1$ signifies a group of formula —$NR_3'$— or —CO—NH—
and $R_3'$ signifies hydrogen, $C_{1-2}$-alkyl or —$X_1$—CO—$NH_2$
among which are preferred those in which $R_3'$ signifies hydrogen or n signifies 0, in particular those of formula

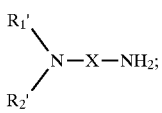 (IIa')

($a_{12}$) Compounds of formula

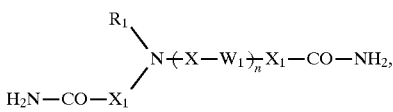 (IIb)

these may be produced for instance by alkylation of corresponding starting amines with —$X_1$—CO—$NH_2$ yielding reactants, e.g. as indicated above; in formula (IIb) $R_1$ signifies preferably $C_{1-2}$-alkyl or —$X_1$—CO—$NH_2$; in formula (IIb) n signifies preferably 0 or 1;

($a_{13}$) Compounds of formula

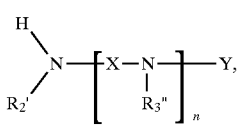 (IIc)

wherein
$R_2''$ signifies hydrogen or a radical of formula —X—$NH_2$
and $R_3''$ signifies hydrogen or $C_{1-2}$-alkyl,
among which the plain polyamines are preferred, i.e. the compounds of formula

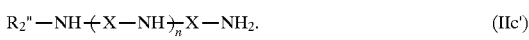

$R_2''$—NH—(X—NH)$_n$—X—$NH_2$. (IIc')

In formulae (IIc) and (IIc') the index n stands advantageously for 0,1 or 2, preferably for 0 or 1, with particular preference for 0. As polyamines of formula (IIc') there may be mentioned for instance ethylenediamine, 1,3-propylenediamine, diethylenetriamine, dipropylenetriamine, ethylene-propylene-triamine, triethylenetetramine and tetraethylenepentamine, which may also serve as starting amines for the production of corresponding substituted products, as indicated above. As compounds of formula (IIa) there may also be employed corresponding heterocyclic compounds, for instance as are obtainable by reaction of piperazine, N-methylpiperazine or morpholine with a compound yielding a radical Y and correspond to the following formula

 (IId)

in which
$W_2$ signifies —O— or —$NR_3'''$—
and $R_3'''$ signifies methyl or Y.

If in formula (IId) $W_2$ signifies —$NR_3'''$— and $R_3'''$ signifies Y, the two symbols Y preferably have the same significance among each other; the compounds in which Y signifies a radical of formula —$X_1$—CO—$NH_2$ may be produced analogously as described above by alkylation with corresponding unsaturated acid amides, chloroalkanoylamides or lactams; those in which Y signifies —X—$NH_2$, in particular in which X contains two or three carbon atoms, may be produced for instance by reaction of the corresponding starting morpholine or piperazine with the nitrile of an unsaturated acid, for instance (meth)acrylonitrile, and reduction of the nitrile group to the corresponding amine, or by reaction of the secondary amino group with an aziridine, e.g. ethyleneimine or propyleneimine, or a corresponding chloroalkylamine.

For the production of compounds (a) the compounds ($a_1$) are advantageously employed in such a way that the primary amino groups and/or the carbamoyl groups —CO—$NH_2$ can be condensed with urea under cleavage of ammonia and any further amino groups present in the molecule are either tertiary or, if they are primary or secondary, they are at least partially alkylated to tertiary amino groups before further reacting and optionally any residual amino groups may be acylated, if desired. The reactants ($a_2$) serve for this purpose. As ($a_2$) there is preferably employed at least one compound which is a compound of formula

 (III)

or $R_5$-Hal, (IV)

in which
$R_4$ signifies hydrogen or methyl,
$R_5$ signifies $C_{1-4}$-alkyl, benzyl, $C_{2-4}$-(β-hydroxyalkyl) or —$CH_2$—CO—$NH_2$
and Hal signifies chlorine or bromine,
or an epihalohydrin, di-($C_{1-2}$-alkyl)-sulphate or $C_{2-4}$-oxirane.

As a compound of formula (III) there is preferably employed acrylamide. In formula (IV) Hal preferably stands for chlorine; $R_5$ preferably stands for methyl, ethyl or benzyl, or the compounds of formula (IV) preferably represent a chlorohydrin e.g. ethylenechlorohydrin. Among the dialkyl-sulphates dimethylsulphate is preferred. Among the oxiranes propyleneoxide and ethyleneoxide are preferred.

The reaction of urea with ($a_1$) is expediently carried out in such a way that per mol of urea there is employed at least one equivalent of ($a_1$), wherein as one equivalent of ($a_1$) there is understood one mol of ($a_1$) divided by the number of total reactive primary amino groups and —CO—NH$_2$ groups; preferably the reactive groups are exclusively primary amino groups.

As compounds ($a_1$) there may be employed those already containing tertiary amino groups such as in particular the compounds of formula (IIa), (IIa') and (IId) or those of formula (IIb) in which $R_1$ signifies $C_{1-2}$-alkyl and/or, if n signifies 1 to 4 and $W_1$ signifies —NR$_3$—, at least one $R_3$' does not signify hydrogen, or of formula (IIc) in which, if n signifies 1 to 4, at least one $R_3$" stands for $C_{1-2}$-alkyl. In place thereof or additionally thereto there may, however, also be employed such compounds ($a_1$) not containing any tertiary amino groups and after the reaction with urea any secondary of even primary amino groups present in the reaction product may be transformed into tertiary amino groups with corresponding alkylating agents.

If ($a_1$) is a unitary compound it is advantageously a compound containing a tertiary amino group. These are mainly amino compounds ($a_1$'), i.e. such as defined under ($a_{11}$) or such of formula (IIb), in which $R_1$ signifies $C_{1-2}$-alkyl and/or, if n signifies 1 to 4 and at least one $W_1$ signifies —NR$_3$'—, at least one $R_3$' has a significance other than hydrogen, or of formula (IIc), in which n signifies 1 to 4 and at least one $R_3$" signifies $C_{1-2}$-alkyl, or of formula (IId).

The other employed amino compounds ($a_1$) which do not contain any tertiary amino groups are principally ($a_1$"), i.e. correspond to those compounds ($a_{12}$) and ($a_{13}$) that do not contain any tertiary amino groups; these are in particular compounds of formula (IIb), wherein $R_1$ signifies hydrogen and, if n signifies 1 to 4 and $W_1$ signifies —NR$_3$'—, $R_3$' signifies also hydrogen, compounds of formula (IIc), wherein n signifies 1 to 4 and $R_3$" signifies hydrogen, and compounds of formula (IIc').

Per mol of urea there are for instance employed at least 1 equivalent and at most 2 mols of ($a_1$). The molar ratio ($a_1$)/urea is advantageously in the range of from 0.75/1 to 2/1, preferably 0.8/1 to 1.9/1, in particular 1/1 to 1.8/1, among which molar ratios ($a_1$)/urea $\geq 1.1/1$ are preferred. The molar ratio of tertiary amino compounds ($a_1$), in particular ($a_1$'), to the total compounds ($a_1$), in particular to ($a_1$')+($a_1$"), is for instance in the range of from 30 to 100 mol-%, advantageously 40 to 100 mol-%, preferably 50 to 100 mol-%. Advantageously, the tertiary amino compounds are such as defined under ($a_{11}$), in particular of formula (IIa'), and/or such as defined under ($a_{13}$) or of formula (IId). If as ($a_1$) there are employed polyfunctional compounds, i.e. those with more that one reactive —NH$_2$ group, these are preferably difunctional, in particular linear, e.g. such as defined under ($a_{12}$), wherein $R_3$' signifies hydrogen or $C_{1-2}$-alkyl, or as defined under ($a_{13}$) or further of formula (IId), wherein $W_2$ signifies —NY—, each Y preferably signifying —X—NH$_2$.

If as ($a_1$) there are employed amino compounds that do not contain any tertiary amino groups in the reaction product of urea and ($a_1$) the present secondary and optionally primary amino groups are at least in part transformed (alkylated) to tertiary amino groups, preferably with at least alkylating agent as listed under ($a_2$). If in the reaction product of urea and ($a_1$) there are present non-reacted N—CO—NH$_2$ groups, these may at least in part be acylated e.g. with an amide ($a_2$) with cleavage of ammonia, or may form with each other a biuret group with cleavage or ammonia.

The reaction of urea with the reactants ($a_1$) may be carried out in a manner known per se, for instance at temperatures above 100° C., advantageously in the range of from 105° to 200° C., preferably 110° to 180° C., e.g. in the absence of solvents or even in the presence of water and/or another inert solvent in which the kind and quantity of the solvent, the equipment and the temperature are expediently chosen in such a way that there may be reached the desired reaction temperature for the cleavage of ammonia. It is of advantage to start in the absence of any solvent and, as soon as the reaction has proceeded so far that the reaction mass has become dense or may solidify with cooling, to add such a quantity of water as is sufficient in order to render the mass stirrable, e.g. 10 to 200% by weight of the reaction mass. The cleavage of ammonia in the reaction of urea with a primary carbamoyl group takes place advantageously in the absence of water. An eventual acylation with an amide ($a_1$) or ($a_2$) may also be carried out at the mentioned temperatures. An alkylation with ($a_2$) takes place advantageously in the presence of a solvent, e.g. of water, and at temperatures in the range of e.g. −15° C. to the boiling temperature of the solvent, advantageously 0° C. to 100° C., preferably 30° C. to 100° C., depending on the alkylating agent. The addition of a double bond or of an aziridine- or epoxy compound can take place by plain admixing or feeding in of the reactants, advantageously in the mentioned temperature ranges. The reaction with halides (bromides or preferably chlorides) takes place advantageously under dehydrohalogenating conditions, e.g. in the presence of an added base or also without adding a base, since in general the basisity of the employed amine may already suffice for the reaction. If required or desired, there may be added a base, e.g. an alkali metal hydroxide (LiOH, NaOH or KOH, preferably sodium hydroxide); in general, especially if there has been started from the preferred amines ($a_1$), the use of an additional base is not necessary.

Preferably there is employed no separate ($a_2$) but the tertiary amines are advantageously employed already as ($a_1$), optionally in combination with non-tertiary amines, as mentioned above.

The reaction with (b) for the quaternization of tertiary amino groups in (a) takes place, for instance, under the same reaction conditions as described above for the production of tertiary amino groups, for instance in the temperature range of from 30° C. to the boiling temperature of the reaction mixture, advantageously at 50° to 100° C., preferably at 60° to 100° C. The quantity of water as a solvent is advantageously chosen in such a way that the reaction product (q) is formed in the form of solution, for instance in the form of a 10 to 70% solution of the quaternized product (q). The quaternization is advantageously carried out with such a quantity of quaternizing agent and for so long that at least 50% of the number of quaternizable amino groups in (a) is quaternized, preferably so that 50 to 100 mol-% of the quaternizable amino groups in the reaction product (a) are quaternized with (b). It is of particular advantage to quaternize with (b) 80 to 100 mol-% of the quaternizable amino groups in (a).

As (b) there is employed ($b_1$) which is advantageously epichlorohydrin or epibromohydrin, more preferably epichlorohydrin, and in which there may if desired additionally be employed ($b_2$) which advantageously is a $C_{1-4}$-alkyl chloride or a di-($C_{1-2}$-alkyl) sulphate. As $C_{1-2}$-alkyl in ($b_2$) comes preferably into consideration ethyl or methyl, and as di-($C_{1-2}$-alkyl) sulphate comes preferably into consideration dimethyl sulphate. ($b_2$) may constitute for instance up to 80 mol-% of ($b_1$)+($b_2$), advantageously 0 to 50 mol-% thereof, in particular 0 to 25 mol-% thereof. Preferably quaternization is carried our solely with ($b_1$).

If there is employed an epihalohydrin as ($a_2$) and also as ($b_1$) respectively as (b), the addition may take place at once and the reaction for the production of the tertiary amino group and the quaternization may also take place in one process stage. With particular advantage quaternization is carried out exhaustively. At the beginning of the reaction with (b) the pH-value of the aqueous reaction mixture is advantageously in the acidic to clearly basic range, in particular depending on (a) and (b), respectively depending on the kind and quantity of the employed compounds ($a_1$) respectively ($b_1$) and optionally employed compounds ($a_2$) respectively ($b_2$), and is mainly in the range of 2 to 13, e.g. 5 to 12.5, advantageously 8 to 12. The pH of the reaction product of (a) with (b) in aqueous solution at a concentration of e.g. 20 to 50% is advantageously in the range of 4 to 10, preferably 5 to 9. The pH of a 20 to 50%-solution of (q) is e.g. in the same range.

As (c) there is preferably employed glyoxal.

The reaction of the quaternary reaction product (q) with (c) may be carried out in aqueous solution, advantageously in the reaction mixture in which the quaternized product (q) has been produced, e.g. under neutral to acidic conditions, advantageously in the pH range of 3 to 7, preferably 3 to 6. The pH may, if required, be adjusted with bases or acids conventional per se, for instance with hydrochloric acid, sulphuric acid or an alkalimetal hydroxide, mainly sodium hydroxide. The reaction is carried out e.g. in the temperature range of from ambient temperature to the boiling temperature of the reaction mixture, advantageously in the range of from 30° to 100° C.

For every mol of urea that has been employed for the production of (a) respectively (q) there are advantageously employed 0.5 to 3 mols, preferably 0.8 to 2.5 mols of (c). The molar ratio of dialdehyde (c) to urea units deriving from the reaction of urea is in particular chosen in such a way that the urea units in (q) are exhaustively reacted with the dialdehyde (c), so that there can also take place an increment of the molecular weight. In place of a dialdehyde of formula (I) there may also be employed as (c) a corresponding urea derivative thereof. As urea derivative of a dialdehyde of formula (I) there is in particular understood a reaction product that is still capable of reacting with further urea respectively with further urea units, and is obtainable for instance from the reaction of 0.25 to 1.1 mols, advantageously 0.4 to 1 mol, of urea with 1 mol of dialdehyde of formula (I), preferably glyoxal. As (c) there may be employed for instance exclusively dialdehyde of formula (I) or a reaction product thereof with urea as described or also a mixture of a dialdehyde with such a reaction product. If in place of a part of the mentioned dialdehyde of formula (I) there is employed a urea derivative thereof the quantitative ratio thereof to the quaternized reaction product (q) is expediently increased accordingly. If for instance in place of the dialdehyde there is employed a urea derivative of the dialdehyde from 1 mol dialdehyde and 0.5 mols of urea, there is expediently employed of this urea derivative twice as much as would correspond to the quantity of non-reacted dialdehyde (c).

The reaction of (q) with (c) is preferably carried out for so long until an evident viscosity increase of the reaction mixture has taken place, but the reaction mixture is still well stirrable.

The produced aqueous products contain the quaternary water soluble polymers (F) as aqueous solution.

By the presence of the reacted component (c) there occurs also an increment of the molecular weight, which leads to an increment of the viscosity of the aqueous solution. Directly after the production of the product e.g. the Brookfield rotational viscosity, measured at an aqueous 25% solution of (F) at 20° C., is below 1000 mPa·s or, measured at an aqueous 50% solution at 20° C., is below 10000 mPa·s.

The products (F) are produced and handled (in particular stored, shipped and used) in the form of aqueous solutions. A particular object of the invention are the aqueous concentrated solutions of (F), in particular those with a concentration of (F) in the range of from 10 to 80% by weight, preferably 20 to 60% by weight.

The pH of the aqueous concentrated compositions of the products (F) is e.g. in the range of from 2 to 8.5, advantageously in the range of from 3 to 8, preferably 3.5 to 7.

During storage the viscosity of the concentrated product may vary, in particular so that for a certain time the viscosity increases slightly. This variation of the viscosity of the product does, however, not impair its applicatory efficiency.

It is assumed that by the reaction of the quaternary urea derivative (q) with (c) there are formed cyclic ureas containing units of the following formulae

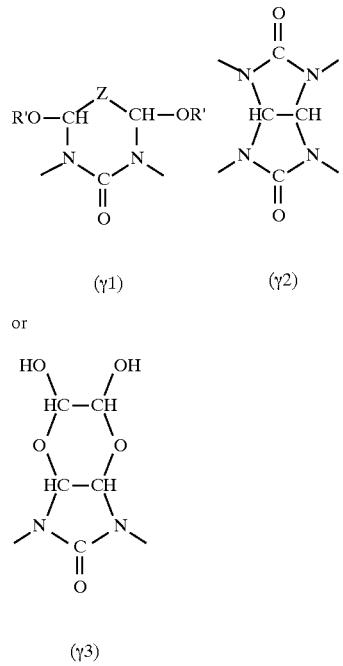

(γ1)    (γ2)

or (γ3)

in the polymer, and, by the quaternization of (q) with (b), contain quaternary groups of the following formulae

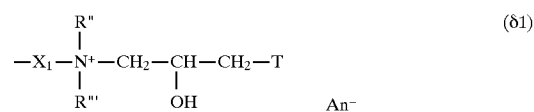

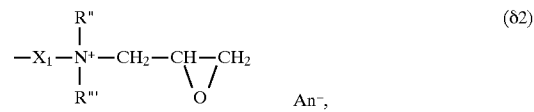

wherein
R' signify each independently from each other hydrogen or —CHOH—Z—CH$_2$OH or a bridge of the formula —CHOH—Z—CHOH— to an available nitrogen of the urea radical
or R' together with a further R' signifies a bridge of the formula —CHOH—Z—CHOH—, R″ signifies $C_{1-4}$-alkyl, —$X_1$—CO—$NH_2$, —$CH_2$—CHOH—$CH_2OH$, —$CH_2$—CHOH—$CH_2Cl$ or

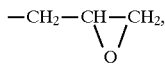

R′″ signifies $C_{1-4}$-alkyl, benzyl or —$X_1$—CO—$NH_2$,

T signifies —OH, Cl or the bond to a further ammonium group and $An^-$ signifies a counterion to the ammonium cation.

The free bonds in ($\gamma_1$), ($\gamma_2$) and ($\gamma_3$) are for instance linked to a bridge member X or over —CO— to a bridge member $X_1$.

The reaction with (b) is advantageously carried out in such a way that there does not occur any substantial molecular weight increment of the product (q) and any substantial or only a slight increment of the viscosity of the product (q).

The anion $An^-$ may be any anion as is formed during the quaternization reaction for instance hydroxy, halide or alkyl sulphate.

Basing of formulae ($\gamma_1$), ($\gamma_3$) and ($\delta_1$) and if as starting amines there are employed those of formulae (IIa') respectively (IIc') in which n=0 and $R_2$″ is a radical —X—$NH_2$, the preferred polymers (F) of the invention may be represented as such as contain the units of formulae

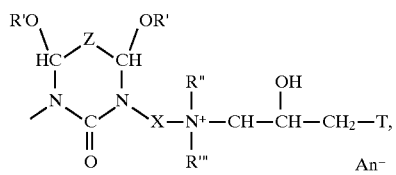
($\epsilon$1)

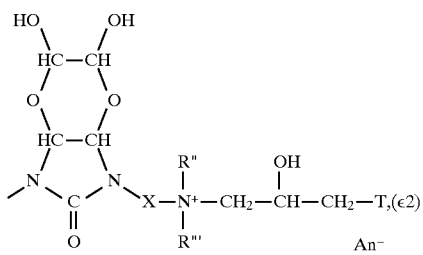
($\epsilon$2)

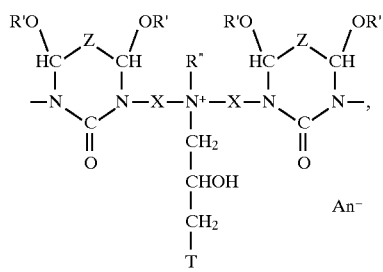
($\zeta$1)

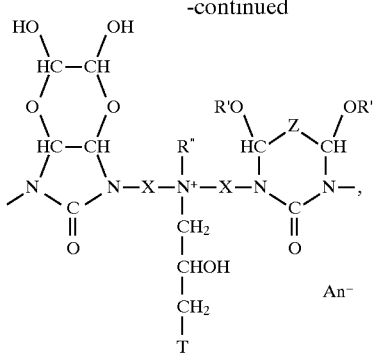
($\zeta$2)

and/or

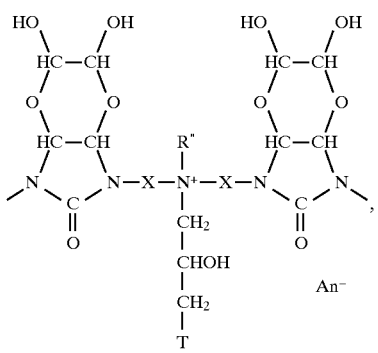
($\zeta$3)

depending on the kind and quantity of the employed aldehyde (d), and where the hydroxy groups in —$CH_2$—CHOH—$CH_2$—T may also form acetal links with the aldehyde- or emiacetal groups present in the system.

The polymeric water soluble quaternary ammonium compounds (F), in particular in form of their concentrated aqueous solutions as described above serve as fixing adjuvants for dyeings of hydrophilic fibrous material, in particular for those that have been produced with non-ionic or preferably anionic dyes, and a further object of the invention is the use of (F) as a fixing adjuvant for dyeings of hydrophilic fibrous material, in particular for dyeings with non-ionic or anionic dyes.

The term "fixing adjuvant" signifies here in particular that the fixation of the dye and/or of the dyeing on the substrate can be influenced by it, so that there results an optimization and/or improvement of the fastnesses, in particular wet fastnesses, of the respective dyeings.

As substrates for the dyeings are suitable any hydrophilic fibrous substrates, that are dyeable as such with substantive, water soluble, in particular non-ionic or anionic dyes, principally fibrous material that contains in the fibre-forming molecules aliphatic hydroxy groups (in particular in cellulosic fibres) or amino groups and/or thiol groups (in particular in natural polyamide fibres, essentially polypeptide fibres). In particular there may be mentioned: optionally modified cellulose (e.g. cotton, hemp, linen, rayon and cellulose acetates) and natural polyamides (wool, leather) and also blends of such fibres with each other or with synthetic and/or semisynthetic fibres, e.g. cellulose/polyester, cellulose/viscose-rayon, wool/polyamide and also elastan-containing fibre blends. The substrates may be in any processing form, e.g. as loose fibres, yarns, yarn strands, spools, weavings, knittings, carpets, fleeces or also half-ready-made and ready-made soft goods; further there may also be mentioned paper and leather. Particularly preferred among the mentioned substrates is textile material, before all cellulosic textile material.

As dyes with which the respective substrates may be dyed are suitable any desired, mainly non-ionic or preferably anionic, in particular water-soluble dyes, as are suitable for the respective substrate. Dyes coming into consideration include in particular direct dyes, reactive dyes, sulphur dyes (in particular as leuco sulphur dyes or Bunte salts) and vat dyes. Among these are to be particularly emphasized direct dyes, sulphur dyes and reactive dyes. The process of the invention is particularly suitable for the dyeing with direct dyes. As dyes of the mentioned groups, which are employable according to the invention, come in particular into consideration those which are defined and in particular also listed in the "Colour Index" under the designations "Direct Dyes", "Sulphur Dyes", "Vat Dyes", "Reactive Dyes" and "Mordant Dyes", or also as are defined in VENKATARAMAN "The Chemistry of Synthetic Dyes". Preferably for the process of the invention there are employed dyeings produced on cellulose textile fibres (principally cotton) or cellulose-containing fibre blends with reactive dyes, sulphur dyes or preferably direct dyes.

The fibrous material may have been dyed with the respective dyes according to any conventional dyeing method e.g. by exhaustion methods or impregnation methods (e.g. by padding, dipping, spraying, applying with a blade or with a roll or by printing) and with any equipments and conditions which are suitable for the respective dyes and/or substrates.

Direct dyes are in general applied under weakly acidic to weakly alkaline conditions. Sulphur dyes and vat dyes (as vat dyes there are meant herein before all those obtainable by sulphurization respectively thionation) are expediently brought into solution in leuco form under alkaline conditions and applied to the substrates under alkaline conditions and after the application the leuco form is transformed on the substrate by oxidation, e.g. by aeration and/or with the aid of an added oxidation agent, e.g. hydrogen peroxide, into the oxidized sulphur dye respectively vat dye form. Reactive dyes (among which are preferred those containing halogen-substituted heterocycles—mainly triazine rings or pyrimidine rings—) are expediently applied under distinctly alkaline conditions (e.g. with sodium carbonate or soda lye) and in the presence of high quantities of added electrolyte (e.g. sodium chloride or sulphate). For the treatment with (F) according to the invention it is of advantage to rinse the respective dyes and, if required, to wash or soap them (e.g. for dyeings with reactive dyes or sulphur dyes) and then to rinse them again. For the fixation with (F) according to the invention, it is not necessary to dry the rinsed dyeing. It may be conveyed directly, without drying, into the next treatment stage for fixation with (F).

The treatment with (F) according to the invention is advantageously carried out in aqueous medium, preferably by impregnation processes. With particular advantage one proceeds according to continuous processes. It is in particular of advantage if the dyeing is carried out by continuous processes so that the dyeing as well as the treatment with (F) can be carried out in one assembly and in one process sequence. It is nevertheless also possible to fix an exhaustion dyeing by continuous processes with (F) or to treat a colour print in the printing machine or according to continuous processes with (F) or also to treat a leather dyeing, before drying, with an (F)-solution, e.g. in a dyeing drum, or also to spray it with an (F)-solution after discharging from the dyeing drum and before drying.

The treatment with the quaternary ammonium compounds (F) according to the invention is carried out expediently from aqueous medium and advantageously under nearly neutral to distinctly acidic conditions, principally under acidic pH-conditions, preferably at pH-values in the range of from 2 to 6, more preferably pH 3 to 5. The concentration of (F) in the treatment liquor is dictated in general by the desired respectively adjusted liquor pick-up of the substrate, by the respective colour depth, and also by the kind of the substrate, the dyeing and the machine, and also by the chosen impregnation process. The concentration of (F) is for instance in the range of 0.01 to 12% by weight, referred to the dry substrate, for dyeings of 1/1 standard depth e.g. in the range of from 0.1 to 6%, preferably 0.5 to 3%, for weaker dyeings correspondingly less, e.g. for 1/3 standard depth 0.03 to 2%, preferably 0.1 to 1%.

The compounds (F) are advantageously employed in the presence of crosslinking adjuvants or accelerators, resp. catalysts, (K). As (K) come in general into consideration such compounds as are otherwise employed in systems for synthetic resin finishings of textiles (e.g. crease proof finishings). As (K) there are advantageously employed substances of acidic reaction, in particular strong organic carboxylic acids (suitably such as are neither decomposed nor volatile under the chosen treatment conditions, preferably $C_{2-6}$-dicarboxylic acids or -hydroxycarboxylic acids, e.g. oxalic acid, succinic acid, lactic acid, tartaric acid, malic acid and citric acid), strong mineral acids or salts of mineral acids (e.g. hydrochloric acid, sulphuric acid, nitric acid, phosphoric acid or fluoboric acid) of acidic reaction in particular ammonium, magnesium or zinc salts or sodium partial salts. Catalysts (K) include e.g. ammonium nitrate, chloride or sulphate, zinc nitrate sulphate or chloride, mono- or diammonium phosphate or magnesium chloride or sulphate or—depending on the chosen pH—also sulphuric acid or phosphoric acid. Among the mentioned salts (K) are preferred before all zinc nitrate and especially magnesium chloride. The employed quantities of (K) are advantageously in the range of from 2 to 80% by weight, preferably 5 to 60% by weight, referred to the polymer (F), the indicated quantity of (K) being calculated as pure acid or pure salt without hydration water; the salts are, however, mostly employed in hydrated form, thus e.g. magnesium chloride or zinc nitrate as hexahydrates.

If product (F) is employed in the form of concentrated solution of correspondingly nearly neutral to acidic pH-value and there is employed (K) especially in the above indicated preferred concentrations the pH of the impregnation liquor may correspond to the above indicated preferred range by plain addition of (F) and (K); if a ph-correction were necessary, the pH may be adjusted by using known acids or bases, as conventionally employed in dye houses, e.g., for lowering the pH-value, with a mineral acid (sulphuric acid, hydrochloric acid, phosphoric acid) or a low molecular aliphatic carboxylic acid, e.g. a mono-, di- or tricarboxylic acid with 1 to 6 carbon atoms and optionally one or two hydroxy groups, e.g. formic acid, acetic acid, lactic acid, tartaric acid, succinic acid, citric acid, malic acid or oxalic acid, or, for increasing the pH-value, with an alkali metal hydroxide or carbonate, e.g. sodium hydroxide, lithium hydroxide, potassium hydroxide, sodium carbonate or potassium carbonate. If desired there may also be employed suitable buffers which are capable to give or maintain a pH-value in the desired range. Preferably, however, the procedure is carried out in such a way that the addition of a separate acid or base or of a buffer is not necessary.

The dyeings impregnated with the (F)-containing and preferably also (K)-containing liquor may then, for fixation of (F), be staked or rolled up in the wet stage and allowed to dwell packaged at low or higher temperature, e.g. according to the cold dwell method at 15° to 50° C., preferably 20° to 40° C., or by dwelling with heat e.g. at temperatures above 40° C., preferably 50° to 90° C. For cold dwelling the dwelling duration may e.g. last 6 hours to 3 days, preferably 8 hours to 2 days; for dwelling at elevated temperature the dwell duration is correspondingly shorter, e.g. in the range of from 30 minutes to 24 hours, preferably 1 to 6 hours. For dyed leather substrates a separate addition of (K) is not absolutely necessary, especially if the leather has been mineral tanned or retanned or if in a preceding stage a magnesium salt or oxide has been employed. The fixation of (F) on the substrate takes place preferably at temperatures above 90° C., in particular above 100° C., e.g. in the range of from 102° to 220° C., depending on substrate and dyeing. For cotton-containing substrates are preferred fixing temperatures in the range of 120° to 210° C., in particular 140° to 200° C., while if the cotton substrates contain also polyester, e.g. in the form of blended weavings or fibre blends, the fixing temperature is advantageously in the range of 160° to 220° C., in particular 160° to 210° C. If the substrates contain elastan fibres the fixing temperature is, however, advantageously below 120° C., in particular in the range of 105° to 120° C. The fixing duration may vary depending on the temperature and the kind and quantity of the employed product (F) and is advantageously in the range of form 20 seconds to 40 minutes, preferably 30 seconds to 10 minutes whereas for fixing temperatures above 140° C. the substrate may also be pre-dried (e.g. for 1 to 20 minutes) e.g. at temperatures between 90° and 135° C.

The fixing agents (F) to be employed according to the invention are in general compatible with further finishing agents and assistants as are employed for the treatment and aftertreatment of dyeings and/or finishings of fibrous material, e.g. with lubricating agents, softeners, antistatic agents, stain resistant finishing agents and synthetic resin finishing agents (e.g. for crease proof finishing). They have an outstanding efficiency in the improvement of fastnesses, in particular wet fastnesses, of dyeings (fastness to water, to water drops, to perspiration and to washing in particular also at 60° C.) and of the migration resistance. Also other fastnesses, such as light fastness, fastness to rubbing, fastness to chlorine-containing bath water, fastness to ozone, fastness to weathering and wet light fastness are in general not impaired.

In the following Examples parts signify parts by weight and the percentages are percentages by weight; the temperatures are indicated in degrees Celsius. In the Application Examples the indicated percentages refer to the dry substrate. The dyes employed in the Application Examples are in commercial form, which by the application methods illustrated in the Examples give the there indicated colour depths. "C.I." stands for "Colour Index" and "RTT" (="Richttyptiefe") stands for "standard depth".

EXAMPLE 1

30.0 parts of ethylenediamine and 60.0 parts of urea are first heated to 100° C. and subsequently within 2 hours to 116° C., by which, under cleavage of ammonia, there is formed a solid reaction product which, before blocking of the stirrer, is treated with 20.0 parts of water and 76.6 parts of dimethylaminopropylamine. There is formed a stirrable suspension, which is heated up to 110° C. and allowed to react at this temperature during 8 hours with cleavage of ammonia. Now there are further added 101.6 parts of water and the mixture is cooled to 35° to 40° C.; at this temperature 69.4 parts of epichlorohydrin are added within 30 minutes with cooling. Subsequently, it is heated within 5 hours to 70° C. and allowed to react for 4 hours at this temperature. Now 85.2 parts of water are added and at 40° to 45° C. there are added 145.3 parts of a 40% aqueous glyoxal solution. After 4 hours at 40°–45° C. there is cooled to ambient temperature and the pH-value is adjusted to 8.1 with 3.7 parts of a 30% aqueous sodium hydroxide solution. The obtained product is an aqueous, light brown, clear solution.

EXAMPLE 2

168.6 parts of dimethylaminopropylamine and 60.0 parts of urea are heated to 115° C. and, after 1 hour at 115°–116° C., heated within 3 hours to 157° C. Then there is cooled to 90° C. and, after the addition of 250 parts of water, at 60° C. there is started the addition of 148.6 parts of epichlorohydrin. The epichlorohydrin addition lasts for 6 hours, while the temperature is maintained between 60° and 65° C. Subsequently, the reaction is further allowed to complete during 2 hours at 95°–100° C. and then there is cooled to 40° C. Then 270.5 parts of a 40% aqueous glyoxal solution are added dropwise and then the reaction is allowed to complete first during 4 hours at 40°–45° C. and subsequently for 5 hours at 80° C. Then there are further added 43.4 parts of water and there is cooled to ambient temperature; the pH-value is now adjusted to 7.0 with 6.4 parts of a 30% aqueous sodium hydroxide solution. The obtained product is an aqueous, light brown, clear solution.

EXAMPLE 3

102.1 parts of dimethylaminopropylamine, 65.5 parts of dipropylentriamine and 60.0 parts of urea are pre-set and heated to 118° C. Then there is heated within 1 hour to 128° C. and within 2 further hours to 134° C. Subsequently, there is heated within 3 hours to 150° C. and the reaction is allowed to complete during 4 hours at this temperature. After cooling to 90° C., 241.5 parts of water are added and the obtained clear solution is cooled to 60° C. Now 207.9 parts of epichlorohydrin are added dropwise during 3 hours at 60°–65° C. and then there is heated to 95° to 100° C. and the reaction is allowed to complete during 2 hours at this temperature. Then there is cooled to 40° C. and, after the addition of 291.2 parts of a 40% aqueous glyoxal solution, the reaction is allowed to complete during 4 hours. The obtained product is an aqueous, light brown, clear solution.

EXAMPLE 4

The procedure is carried out as described in Example 3, but there are employed 76.5 parts of dimethylaminopropylamine instead of 102.1 parts, 72.5 parts of bis(aminopropyl) methylamine instead of 65.5 parts of dipropylenetriamine and 115.6 parts of epichlorohydrin instead of 207.9 parts. The obtained product is an aqueous, light brown, clear solution.

EXAMPLE 5

220 parts of a mixture of 72.5% N,N'-bis-(dimethylaminopropyl)-urea and 27.95% of N-(dimethylaminopropyl)-urea are pre-set and, after the addition of 277 parts of water, heated to 60° C. At this temperature 164.5 parts of epichlorohydrin are added regularly dropwise within 4 hours and, after heating to 95° C., the reaction is allowed to complete during 2 hours at this temperature. The reaction mixture is then cooled to ambient temperature. 600 parts thereof are treated with 272 parts of a 40% aqueous glyoxal solution. After the glyoxal addition there is heated to 40° C. and, after 4 hours at 40°–45° C., heated to 80° C. After 5 hours at 80° C. there is cooled to ambient temperature and the pH-value is adjusted to 7.0 by addition of about 5.6 parts of 30% soda lye. After the addition of 42.4 parts of water the product is discharged. The obtained product is an aqueous, light brown, clear solution.

EXAMPLE 6

The procedure is carried out as described in Example 5, whereas the mixture of 72.05% N,N'-bis-(dimethylaminopropyl)-urea and 27.95% of N-(dimethylaminopropyl)-urea is produced as follows: 598 parts of urea and 598 parts of a mixture of 172 parts of N-(dimethylaminopropyl)-urea and 426 parts of N,N'-bis-(dimethylaminopropyl)-urea are heated to 126° C. with stirring. Now with connection to an ammonia absorption system at 850 mbar residual pressure in the reaction flask 1760 parts of N,N-di-methylaminopropylamine are added regularly dropwise within 6 hours, by which ammonia is formed and recovered. Now the reaction is allowed to continue for 1 further hour at 131° C. then there is heated during 4 hours to 148° C. and the reaction is allowed to complete during 20 minutes at 148°–150° C. Subsequently, there is cooled to ambient temperature. There are obtained about 2573 parts of a mixture of about 1854 parts of N,N'-bis-(dimethylaminopropyl)-urea and about 717 parts of N-(dimethyl-aminopropyl)-urea.

APPLICATION EXAMPLES A1 TO A5

A well rinsed and dried red cotton dyeing of 1/1 RTT, obtained with 1.9% of C.I. Direct Red 89, is padded in a liquor containing 60 g/l of the respective products obtained according to Examples 1 to 5 and 18 g/l magnesium chloride hexahydrate and then squeezed to a pick-up of 80% and dried during 3 minutes at 130° C. Subsequently, the goods are subjected during 1 minute to a dry heat treatment at 170° C. There is obtained a red dyeing with very high wet fastnesses, in particular fastnesses to washing.

APPLICATION EXAMPLES B1–B5 TO K1–K5

The procedure is carried out as described in Application Examples A1 to A5 with the difference that instead of C.I. Direct Red 89 there are employed the dyes set out in the following Table in the indicated concentrations for achieving the respective colour intensity. There are obtained dyeings of very high wet fastnesses in particular fastnesses to washing.

TABLE

| Application Example | Dye | Concentration | RTT |
|---|---|---|---|
| B1–B5 | C.I. Direct Yellow 152 | 0.95% | 1/1 |
| C1–C5 | C.I. Direct Yellow 162 | 1.35% | 1/1 |
| D1–D5 | C.I. Direct Orange 39 | 1.4% | 1/1 |
| E1–E5 | C.I. Direct Red 227 | 2.7% | 1/1 |
| F1–F5 | C.I. Direct Blue 71 | 1% | 1/1 |
| G1–G5 | C.I. Direct Blue 85 | 1.3% | 1/1 |
| H1–H5 | C.I. Direct Red 224 | 2.15% | 1/1 |
| I1–I5 | C.I. Direct Blue 199 | 0.8% | 1/3 |
| J1–J5 | Optisal Red R SGR* | 1.4% | 1/1 |
| K1–K5 | Optisal Royal Blue 3RL SGR* | 2.65% | 1/1 |

*Dyes of CLARIANT (Schweiz) AG (Muttenz, Switzerland)

APPLICATION EXAMPLES L1 TO L5

A rinsed, washed and dried navy-blue cotton dyeing obtained with 6% of C.I. Reactive Blue 79 is padded with a liquor containing 40 g/l of each of the products of Examples 1 to 5 and 12 g/l of magnesium chloride hexahydrate, then squeezed to a pick-up of 80% and dried during 3 minutes at 130° C. Subsequently, the goods are condensed during 1 minute at 170° C. There is obtained a navy-blue dyeing of a very high level of wet fastnesses.

APPLICATION EXAMPLES M1 TO M5

A rinsed and oxidized cotton dyeing of 5% of C.I. Leuco Sulphur Black 1 (added in the form of a 25% aqueous composition) is aftertreated under the conditions described in Application Examples L1 to L5. There is obtained a black dyeing with a very high level of fastness to washing.

APPLICATION EXAMPLE N1 TO N5

A dyeing obtained on polyester/cotton (65/35) with 0.37% C.I. Direct Red 89, 0.12% C.I. Disperse Yellow 235 and 0.26% C.I. Disperse Red 371 (dyed one bath at 130° C., rinsed and dried) is padded in a liquor containing 20 g/l of each of the products of Examples 1 to 5 and 6 g/l of $MgCl_2.6H_2O$ and condensed under the conditions described in Application Example L1. There is obtained a red dyeing with very good wet fastnesses.

We claim:

1. Polymeric, water soluble, quaternary ammonium compounds (F) obtainable by quaternization of
   (a) at least one amino-group-containing urea compound that contains one or more groups of the formula $$—NH—CO—NH—G—L— \quad (\alpha)$$

in which
   G signifies a bridging group
   and L signifies a tertiary, quaternizable amino group
   with
   (b) ($b_1$) an epihalohydrin and optionally
       ($b_2$) at least one further quaternizing agent
   to a quaternized product (q)
   and reaction of the quaternized product (q) with
   (c) a dialdehyde of formula $$\begin{array}{c} H \quad H \\ | \quad\quad | \\ O=C—Z—C=O, \end{array} \quad (I)$$

in which Z signifies methylene or the direct bond, or a urea derivative thereof.

2. Quaternary ammonium compounds (F) according to claim 1 characterized in that
   (a) is a urea compound containing at least one tertiary, quaternizable amino group and which is obtainable by condensation of urea with
       ($a_1$) at least one polyamine that contains at least one primary amino group and at least one secondary of tertiary amino group or at least one aminoamide that contains an unsubstituted carbamoyl group and at least one secondary or tertiary amino group or mixtures thereof; and where any primary or secondary amino groups remain, reaction with
       ($a_2$) at least one further aliphatic reactant which is capable of an alkylating or acylating reaction with urea or with a reaction product of urea with ($a_1$), or with both, with formation of an acylated or tertiary amino group.

3. Quaternary ammonium compounds (F) according to claim 1 in the form of an aqueous composition with an (F)-content in the range of 10 to 80% by weight.

4. Aqueous composition of quaternary ammonium compounds (F) according to claim 1 with an (F)-content in the range of 10 to 80% by weight which in form of an aqueous 25% solution displays a rotational viscosity <1000 mPa·s at 20° C.

5. Composition according to claim 3 with a pH in the range of 2 to 8.5.

6. Quaternary ammonium compounds (F) according to claim 2 in the form of an aqueous composition with an (F)-content in the range of 10 to 80% by weight.

7. Aqueous composition of quaternary ammonium compounds (F) according to claim 2 with an (F)-content in the range of 10 to 80% by weight, which in the form of an aqueous 25% solution displays a rotational viscosity <1000 mPa's at 20° C.

8. A method of fixing dyeings of hydrophilic fibrous materials comprising the steps of:

provinding a dyed hydrophilic fibrous material; and contacting a polymeric quaternary ammonium compound (F) according to claim 1 as a fixing adjuvant.

9. A method of fixing dyeings of hydrophilic fibrous materials, according to claim 8, wherein said hydrophilic fibrous material is cellulose and the dyes are selected from the group of direct, reactive or sulphur dyes.

10. A method of fixing dyeings of hydrophilic fibrous materials comprising the steps of:

providing a dyed hydrophilic fibrous material;

aftertreating said dyed dyed hydrophilic fibrous material with a polymeric quaternary ammonium compound (F) according to claim 1, as a fixing adjuvant in continuous processes.

11. A method of fixing dyeings of hydrophilic fibrous materials, according to claim 8, further comprising the steps of:

adjusting the pH to a neutral to acidic value; and adding a catalyst (K).

12. A method of fixing dyeings of hydrophilic fibrous materials, according to claim 11, wherein the catalyst (K) is selected from magnesium chloride or magnesium sulphate.

13. A method of fixing dyeings of hydrophilic fibrous materials, according to claim 8, wherein (a) is a urea compound containing at least one tertiary, quaternizable amino group and which is obtainable by condensation of urea with ($a_1$) at least one polyamine that contains at least one primary amino group and at least one secondary of tertiary amino group or at least one aminoamide that contains an unsubstituted carbamoyl group and at least one secondary or tertiary amino group or mixtures thereof; and where any primary or secondary amino groups remain, reaction with ($a_2$) at least one further aliphatic reactant which is capable of an alkylating or acylating reaction with urea or with a reaction product of urea with ($a_1$), or with both, with formation of an acylated or tertiary amino group.

14. A method of fixing dyeings of hydrophilic fibrous materials, according to claim 8, herein (F) is employed in the form of an aqueous composition with an (F)-content in the range of 10 to 80% by weight.

* * * * *